Sept. 23, 1952     H. F. HEYNAU     2,611,276
POWER TRANSMISSION UNIT

Filed June 8, 1950     2 SHEETS—SHEET 1

INVENTOR.
HANS F. HEYNAU.
BY Dybvig & Dybvig
His Attorneys.

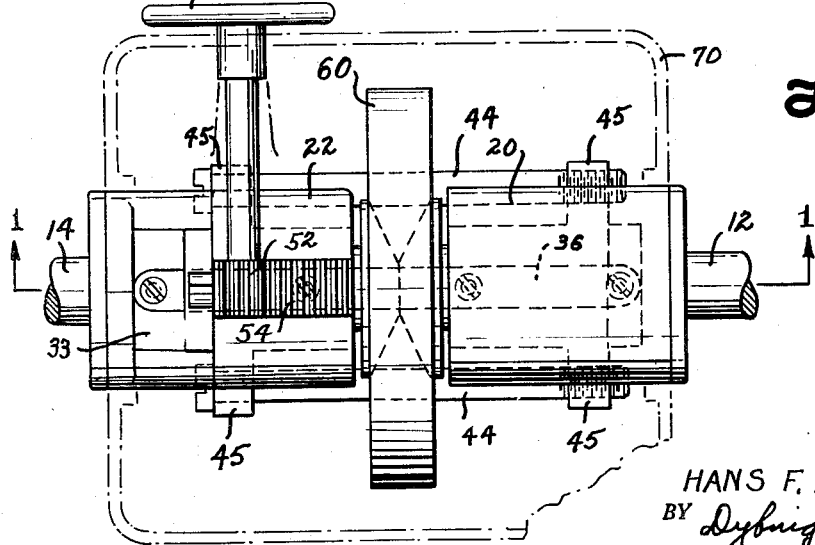

Patented Sept. 23, 1952

2,611,276

UNITED STATES PATENT OFFICE 2,611,276

POWER TRANSMISSION UNIT

Hans Felix Heynau, Hollywood, Calif.

Application June 8, 1950, Serial No. 166,846

15 Claims. (Cl. 74—192)

This invention relates to a power transmission unit and more particularly to a variable speed type of power transmission mechanism.

It is an object of this invention to provide a simplified power transmitting mechanism of the type in which one pair of cones is stationary, whereas the second pair of cones is arranged to be longitudinally movable and wherein the power is transmitted from the one pair of cones to the other pair of cones by means of a steel ring.

This invention represents an improvement over constructions of the type shown in Heynau Patent No. 2,032,015 and Kuner et al. Patent No. 2,441,276.

In the power transmitting mechanisms presently in use, the cone carriers for the stationary cones are either integrally connected with the transmission housing or they are designed as complicated castings, with opposite bores which are difficult to machine to the close tolerances required. Likewise, the designs of the movable cone carriers heretofore used have presented assembly difficulties which are overcome by my invention.

Thus, it is an object of this invention to provide an improved and simplified arrangement for providing proper alignment of the four cones. More particularly, it is an object of this invention to provide an arrangement requiring simple individual components which can be machined easily to close tolerances and which can be assembled to provide perfect alignment of the parts.

Still another object of this invention is to provide an arrangement wherein the cones and their driving shafts are entirely identical and wherein the cone carriers are identical in regards to the essential machining operations, so that the same jigs and the same set-up can be used for performing the principal machining operations on all of the cone carriers. The only difference is that for the two movable cone carriers, each is provided with two small holes which are drilled and tapped subsequently to the main machining operations.

Still another object of this invention is to provide an arrangement of parts which makes it possible to correct for minute misalignment of the individual cone carriers and in which there is no danger of the parts binding or becoming distorted.

Another object of this invention is to provide a power transmitting mechanism wherein the axial and radial stresses are completely absorbed within the carrier system and which are not transmitted to the support or housing into which the transmission is incorporated. More particularly, it is an object of this invention to provide a variable speed power transmission unit which can be incorporated into thin walled housings or frames of machine tools and other kinds of machinery without the need for extreme accuracy or great strength in such housings or frames.

Other objects and advantages reside in the construction of parts, the combination thereof and the mode of operation, as will become more apparent from the following description.

In the drawings:

Figure 3 is a plan view of the mechanism shown in Figures 1 and 2;

Figure 4 is a side elevational view of the stationary cone carrier;

Figure 5 is an end elevational view of the cone carrier shown in Figure 4;

Figure 6 is a side elevational view of one of the movable cone carriers;

Figure 7 is an end elevational view of the movable cone carrier shown in Figure 6;

Figure 8 is an elevational view of one of the connecting rods;

Figure 9 is a plan view of the guide rail; and

Figure 10 is a sectional view taken substantially on line 10—10 of Figure 9.

Figure 1:
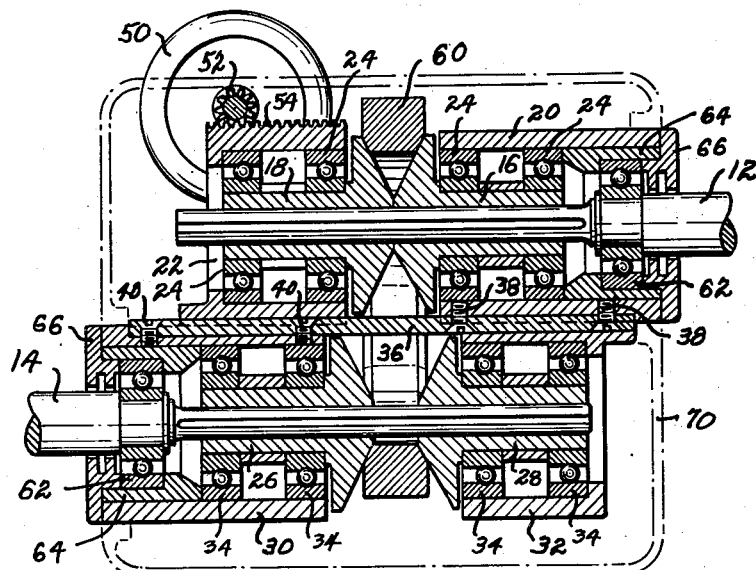
Figure 1 is a vertical sectional view of a preferred embodiment of my power transmission unit.
Figure 2:
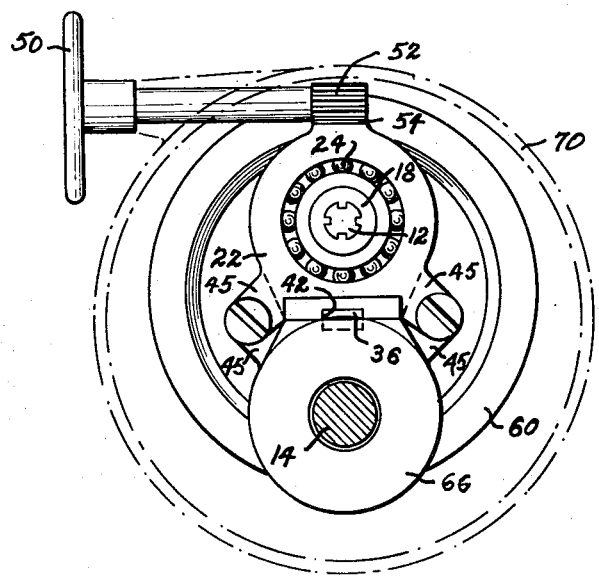
Figure 2 is an end elevational view of the mechanism shown in Figure 1.

Referring now to the drawings wherein I have shown a preferred embodiment of my invention, reference numeral 12 designates a main drive shaft which may be a continuation of a motor or engine shaft or may be operatively connected therewith by any suitable power transmitting means. Reference numeral 14 designates the driven shaft or power delivery shaft. Splined upon the shaft 12 is a pair of sleeves 16 and 18 which are supported within carriers 20 and 22 respectively by means of conventional ball bearing assemblies 24. A corresponding pair of sleeves 26 and 28 are splined upon the driven shaft 14 and these sleeves are likewise journalled for rotation relative to the carriers 30 and 32 by means of ball bearing assemblies 34.

The carriers 20 and 30 are generally similar in construction and are arranged in fixed relationship relative to one another by means of a rigid guide rail 36, the one end of the guide rail 36 being secured to the carrier 20 by means of screws 38, as shown, and the diagonally disposed carrier 30 is secured to the other end of the guide rail 36 by means of the screws 40. This guide rail consists of a relatively simple rectangular steel bar that takes up the thrust load within the power transmitting system and also serves as a guide for the two movable and diagonally disposed carriers 22 and 32 respectively. As clearly seen in the drawings, the guide rail 36 is mounted between and parallel to the shafts 12 and 14.

As best indicated in Figures 5 and 7, the carriers are provided with open-faced channels 42 which cooperate with the guide rail 36. It should be noted that the carrier guides are relatively long and narrow, whereby it is possible to maintain perfect squareness with a minimum amount of friction to movement of the carriers. The length of the guide channels 42 should be at least three times their width. The movable cone carriers 22 and 32 are adjustably bolted to one another by means of the bolts 44 which connect the ears 45 provided on the carriers 22 and 32 as shown, so that these cone carriers move in unison at all times. The bolts 44, as clearly seen in the drawings, are symmetrically disposed with respect to a plane passing through the axes of rotation of the drive shaft and the driven shaft, one bolt being located on one side of the plane and the other bolt on the other side of the plane to thereby obtain a balanced relation with relation with respect to the carriers supported thereby.

The speed ratio between the drive shaft 12 and the driven shaft 14 may be varied by manipulating the hand wheel 50 which for simplicity of illustration has been shown provided with a pinion 52 meshing directly with a rack 54 which is secured to or formed integrally with the movable cone carrier 22.

The power is transmitted from the drive shaft 12 to the driven shaft 14 by means of a rigid friction ring 60 connecting the cone pulley formations provided by the beveled flanges on the sleeves 16, 18, 26 and 28, as best illustrated in Figure 1.

Each of the shafts 12 and 14 is journalled in similar ball bearing assemblies 62 which are supported within sleeves 64 carried by the stationary cone carriers, as shown. Each of the cone carriers 20 and 30 is provided with a machined surface 31 (see Figures 4 and 5) which slidably engages the machined surfaces 33 formed on the cone carriers 22 and 32 (see Figures 6 and 7).

The mechanism thus described hereinabove may be supported in a light weight housing or frame, such as the frame 70. By virtue of the construction used, it is obvious that the housing 70 is not required to carry any appreciable strains or stresses, nor is it necessary that the housing be accurately machined, since the main surfaces which serve to align the parts are all provided independently of the housing 70.

Lubricant retaining rings 66 are provided as shown for restricting the passage of lubricant from the housing 70. The housing 70 has been shown in dot-dash lines, as its shape and construction may be varied considerably and the housing does not carry heavy stresses as in some of the earlier designs.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a variable speed transmission; a drive shaft; a driven shaft extending parallel to the drive shaft; first cone means supported on said drive shaft; second cone means supported on said driven shaft; and a power transmitting means connecting said first and second cone means; each of said cone means comprising a pair of sleeves splined to its respective shaft and having a beveled flange cooperating with said power transmitting means, a separate carrier for each of said sleeves, and a guide rail positioned between the shafts and extending parallel thereto, said guide rail being connected to a pair of diagonally disposed carriers and forming a guide for the other carriers.

2. In a variable speed transmission, a drive shaft, a driven shaft, first cone means supported on said drive shaft, second cone means supported on said driven shaft, and a power transmitting means connecting said first and second cone means, each of said cone means comprising a pair of separably mounted sleeves each of which is provided with a beveled flange at one end, a separate carrier for each of said sleeves, a guide rail located between the two shafts and rigidly connecting two of said carriers, the rest of said carriers being slidably mounted on said guide rail.

3. In a variable speed transmission, a drive shaft, a driven shaft extending parallel to the drive shaft, first cone means supported on said drive shaft, second cone means supported on said driven shaft, a power transmitting means connecting said first and second cone means, each of said cone means comprising a pair of separable beveled flanges, a separate carrier for each of said flanges, and a guide rail rigidly connecting two of said carriers, the remainder of said carriers being slidably mounted on said guide rail, said guide rail comprising a rectangular bar positioned between the shafts and parallel thereto, said carriers having guide recesses formed therein complementary to said guide rail.

4. In a variable speed transmission, a drive shaft, a driven shaft extending parallel to the drive shaft, first cone means supported on said drive shaft, second cone means supported on said driven shaft, a power transmitting means connecting said first and second cone means, each of said cone means comprising a pair of separable and opposed beveled flange means, a separate carrier for each of said flange means, and a pair of means for connecting a pair of said carriers for movement in unison, said pair of means being offset from and symmetrically disposed with respect to the plane passing through the axes of the shafts, said pair of means including means for adjusting the distance between said pair of carriers.

5. In a variable speed transmission, a drive shaft, a driven shaft extending parallel to the drive shaft, first cone means supported on said drive shaft, second cone means supported on said driven shaft, a power transmitting means connecting said first and second cone means, each of said cone means comprising a pair of separable beveled flange means, a separate carrier for each of said flange means, a guide rail rigidly connecting a first pair of said carriers, a second pair of said carriers being slidably mounted on said guide rail, said guide rail comprising a rectangular bar positioned between the drive shaft and the driven shaft, said carriers having guide recesses formed therein complementary to said rectangular bar, and means for adjustably connecting said second pair of carriers for movement in unison.

6. In a variable speed power transmitting unit of the friction type, a drive shaft, a driven shaft parallel to said drive shaft, a pair of sleeves splined to said drive shaft, a pair of sleeves splined to said driven shaft, each of said sleeves having beveled flanges, a separate carrier for each of said sleeves, said carriers comprising substantially cylindrical elements surrounding the respective sleeves carried thereby, and means for rigidly connecting a carrier on one of said shafts to a carrier on another of said shafts comprising a detachable guide bar having machined surfaces, said guide bar being positioned parallel to and between the drive shaft and the driven shaft, the carriers on the one shaft having machined surfaces directly engaging machined surfaces on the carriers on the other of said shafts and on said guide bar.

7. In a variable speed transmission, a drive shaft, a driven shaft, first cone means supported on said drive shaft, second cone means supported on said driven shaft, a power transmitting means connecting said first and second cone means, each of said cone means comprising a pair of separable beveled flanges, a separate carrier for each of said flanges, and a relatively long and narrow guide rail rigidly connecting two of said carriers, each of said carriers being provided with recesses for engaging said guide rail, said recesses being more than three times longer than wide.

8. A speed changing mechanism comprising in combination: a casing; a driving shaft and a driven shaft arranged in parallel relationship within said casing; a pair of beveled discs mounted on each of said shafts for rotation therewith, one disc of each pair being movable axially towards and from the other disc of the same pair, individual carrier means for each of said discs, a sole guide bar rigidly and detachably connecting the carrier means for the stationary discs, said guide bar extending parallel to and positioned between the driving shaft and the driven shaft; friction means engaging the beveled portion of both pairs of discs for transmitting motion from one pair to the other; means for shifting the carriers for said movable discs thereby to vary the position of said friction means with relation to the centers of rotation of the discs, and means for transmitting radial pressure from said discs directly to said carrier means independently of said casing, said means consisting of bearing surfaces provided directly on said carrier means.

9. A variable speed power transmission unit of the type wherein a power transmission element is progressively engageable with pairs of driving and driven cones at different distances from their axis of rotation by axial adjustment of at least one cone of each pair, to change the speed ratio of driving and driven shafts upon which the cones are carried, including a guide bar positioned between the driving and driven cones in a plane passing through the axes of rotation of the driving and driven cones, a first pair of separate cone carriers removably attached to the opposite ends of said guide bar, a second pair of separate cone carriers slidably supported on said guide bar for the inversely axially adjustable cones of the respective pairs, and means for adjusting the axial distance between said last named carriers.

10. A variable speed power transmission unit of the type wherein a power transmission element is progressively engageable with pairs of driving and driven cones at different distances from their axis of rotation by axial adjustment of at least one cone of each pair, to change the speed ratio of driving and driven shafts upon which the cones are carried, including a guide bar, a first pair of separate cone carriers slidably supported to the opposite ends of said guide bar, a second pair of separate cone carriers slidably supported on said guide bar for the inversely axially adjustable cones of the respective pairs, and means for adjusting the axial distance between said last named carriers, said last named means comprising a pair of rods arranged parallel to the axis of rotation of said cones and each having a threaded connection to one of said cone carriers, said rods being offset from and symmetrically disposed with respect to the plane passing through the axes of rotation of the cones.

11. A variable speed power transmission unit of the type wherein a power transmission element is progressively engageable with pairs of driving and driven cones at different distances from their axis of rotation by inverse axial adjustment of at least one cone of each pair, to change the speed ratio of driving and driven shafts upon which the cones are carried, including a guide bar, a first pair of separate cone carriers attached to the opposite ends of said guide bar, a second pair of separate cone carriers slidably supported on said guide bar for the inversely axially adjustable cones of the respective pairs, and means for adjustably connecting said last named carriers, said means for adjustably connecting said last named carriers comprising a pair of parallel rods, each having a screw threaded connection with one of said carriers whereby the tension between the cones and the power transmission element may be adjusted.

12. In a variable speed transmission, a drive shaft, a driven shaft extending parallel to the drive shaft, first cone means supported on said drive shaft, second cone means supported on said driven shaft, and a power transmitting means connecting said first and second cone means, each of said cone means comprising a pair of slidably mounted sleeves each of which is provided with a beveled flange at one end, a separate carrier for each of said sleeves, a guide rail rigidly connecting two of said carriers positioned between and extending parallel to the drive shaft and the driven shaft, the other of said carriers being slidably mounted on said guide rail, the carriers for the sleeves mounted on the drive shaft having flat machined surfaces slidably engaging complementary flat machined surfaces provided on the carriers for the sleeves mounted on the driven shaft.

13. In a variable speed transmission, a drive shaft, a driven shaft extending parallel to the drive shaft, first cone means supported on said drive shaft, second cone means supported on said driven shaft, a power transmitting means connecting said first and second cone means, each of said cone means comprising a pair of separable beveled flange means, a separate carrier for each of said flange means, a guide rail rigidly connecting a first pair of said carriers, a second pair of said carriers being slidably mounted on said guide rail, said guide rail comprising a rectangular bar, said guide rail extending parallel to and positioned in a plane passing through the axes of rotation of the two shafts, said carriers having guide recesses formed therein complementary to said rectangular bar, and means for adjustably connecting said second pair of carriers for movement in unison, the carriers for the cone means on the drive shaft being arranged in radial contact with the carriers for the cone means on the driven shaft whereby the radial pressure developed within the cone system is taken up at the point of contact between said carriers.

14. A power transmitting system including a drive shaft, first and second sleeves splined thereon, first and second carriers for said first and second sleeves respectively, a driven shaft, third and fourth sleeves splined to said driven shaft, third and fourth carriers for said third and fourth sleeves respectively, means for transmitting power from said first and second sleeves to said third and fourth sleeves comprising a rigid friction ring connecting said first and second sleeves to said third and fourth sleeves, means disposed wholly between said drive shaft and said driven shaft for absorbing the thrust load within the power transmitting system and for holding said first and third sleeves in fixed relationship relative to one another, said last named means including a guide rail connecting the first and third carriers and for slidably supporting the second and fourth carriers, said second and fourth channels for receiving said guide rail, and means for adjustably bolting said second and fourth carriers together.

15. A power transmitting system including a drive shaft, first and second sleeves splined thereon, first and second carriers for said first and second sleeves respectively, a driven shaft, third and fourth sleeves splined to said driven shaft, third and fourth carriers for said third and fourth sleeves respectively, means for transmitting power from said first and second sleeves to said third and fourth sleeves comprising a rigid friction ring connecting said first and second sleeves to said third and fourth sleeves, means disposed wholly between said drive shaft and said driven shaft for absorbing the thrust load within the power transmitting system and for holding said first and third sleeves in fixed relationship relative to one another, said last named means including a guide rail connecting the first and third carriers and for slidably supporting the second and fourth carriers, said second and fourth carriers having open faced relatively long and narrow channels for receiving said guide rail, means for adjustably bolting said second and fourth carriers together, and means including a rack secured to said second carrier for shifting said second carrier relative to said first carrier.

HANS FELIX HEYNAU.

REFERENCES CITED

The following references are of record in the file of this patent:

UNITED STATES PATENTS

| Number | Name | Date |
|---|---|---|
| 397,228 | Emerick | Feb. 5, 1889 |
| 1,891,847 | Stroedter | Dec. 20, 1932 |
| 2,032,015 | Heynau | Feb. 25, 1936 |
| 2,199,491 | Heynau | May 7, 1940 |
| 2,441,276 | Kuner et al. | May 11, 1948 |

FOREIGN PATENTS

| Number | Country | Date |
|---|---|---|
| 411,834 | Great Britain | June 7, 1934 |